(12) United States Patent
Raghunandan

(10) Patent No.: US 6,760,722 B1
(45) Date of Patent: Jul. 6, 2004

(54) COMPUTER IMPLEMENTED AUTOMATED REMOTE SUPPORT

(75) Inventor: Hulikunta Prahlad Raghunandan, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/572,396

(22) Filed: May 16, 2000

(51) Int. Cl.[7] .............................................. G06F 17/30
(52) U.S. Cl. ........................................ 707/3; 707/102
(58) Field of Search .......................... 707/10, 3, 102; 705/50

(56) References Cited

U.S. PATENT DOCUMENTS

| | | | | |
|---|---|---|---|---|
| 5,107,500 A | * | 4/1992 | Wakamoto et al. | 714/26 |
| 5,126,933 A | * | 6/1992 | White, III | 700/47 |
| 5,488,732 A | | 1/1996 | Ryu et al. | |
| 5,740,357 A | * | 4/1998 | Gardiner et al. | 714/57 |
| 5,862,223 A | * | 1/1999 | Walker et al. | 705/50 |
| 5,928,369 A | | 7/1999 | Keyser et al. | |
| 5,963,884 A | * | 10/1999 | Billington et al. | 702/56 |
| 6,012,152 A | * | 1/2000 | Douik et al. | 714/26 |
| 6,029,258 A | * | 2/2000 | Ahmad | 714/46 |
| 6,477,531 B1 | * | 11/2002 | Sullivan et al. | 707/10 |

* cited by examiner

*Primary Examiner*—Wayne Amsbury
*Assistant Examiner*—CamLinh Nguyen
(74) *Attorney, Agent, or Firm*—Manny Schecter; T. Rae Coca; Anthony V S England

(57) ABSTRACT

This invention relates to a computer implemented automated remote support in a computing system that utilizes machine learning to provide constantly improving support capability. It comprises a means for parsing input requests, means for automatically executing test cases, a Database for storing data pertaining to behaviour of products and Multiproduct combinations, as well as searching means for searching through the Database for previous occurrences of similar requests. An Expert System utilizing machine learning capabilities generates the final solution and constantly updates the organization of the data in the Database in order to improve the effectiveness of subsequent searches.

24 Claims, 3 Drawing Sheets

COMPUTER IMPLEMENTED AUTOMATED REMOTE SUPPORT

This invention relates to a computer implemented automated remote support in a computing system utilizing machine learning to provide a support capability that enhances automatically with use.

BACKGROUND

Product support is a key activity in any business and certainly, the prime focus in a business related to providing services to customers. Traditionally this support is provided in a structured manner depending on the level of support necessary. For instance, many organisations provide a three level support:
1. Level-1: Telephonic support.
2. Level-2: Country/Region expert. May include visits by an engineer
3. Level-3: Highest level of support. Provided by the maintenance/development team.

With the proliferation of products that need to be supported, as well as the rapidly increasing competitiveness as more service providers enter the market and vye for market share, it is becoming increasingly necessary to provide a constantly improving level of support. This situation is further complicated by the scarcity of trained manpower as well as the constant need for upgradation of their skills through training programs. There is now a clear realisation of an urgent need for improving the effectiveness of available manpower.

One approach to solving this problem is to provide some degree of automation in the support activity. Some attempts have been made in this direction. U.S. Pat. Nos. 5,928,369 and 5,488,732 are examples of techniques evolved for this purpose. However, none of the available methods addresses the problem adequately and in a generic manner. U.S. Pat. No. 5,928,369, for example, limits itself to a problem relating only to computer software in which the problem data is submitted in the form of a stack trace. Similarly, U.S. Pat. No. 5,488,732 deals only with a system for generating an automatic support tool and not with the support system itself.

The object of this invention is to provide a system that offers a continuously self-improving capability for automated response with respect to providing customer support.

THE INVENTION

To achieve the said objective this invention provides in a computing system including a means for electronically receiving requests, a computer implemented automated remote support comprising the combination of said computing system with:

a means for prioritising electronically received support request, a means for parsing each said support request to extract actual and expected behaviour information and test case data, if any, and compiling actual and expected behaviour data in a prescribed format, the said formatted output is connected to a searching means for previous occurrences of similar behaviour in a data base, a means for generating the final solution or suggestions, using the results of the search, a means for updating the database to refine the organization of the data in order to improve the effectiveness of subsequent search operations, the updations being performed even if no input requests are received, a means for forwarding of the request to a system expert in case a solution is not found.

The support request is received through a mailing system or via a network.

The means for parsing the support request is a standard or custom-designed parsing system.

The searching means is a search engine.

The said database contains information relating to the functionality, specifications and behaviour, including reported problems and their solutions, for individual products as well as combinations of products.

The said database is structured as a single entity or as a combination of multiple entities in order to improve the effectiveness of searching.

The said database consists of a knowledge cache containing the most recent information relating to individual products, a multi-product view cache containing the most recent views on various product combinations, and a set of knowledge bases that contain all available information on individual products as well as product combinations, The means for generating the final solution or suggestions is an expert system The means for updating the database is the said expert system or different expert system with self-learning abilities.

The output of the said parsing means is further connected to an automatic test execution means for using test data extracted from the input request in order to confirm the reported behaviour as well as to obtain any additional inputs if possible, the output of said automatic test execution means being connected to the parsing means which generates the final definition of the expected and actual behaviour in a prescribed format.

The said computing system is a single computing system or a plurality of interconnected computing systems.

The test execution system is a computing system or a plurality of interconnected computing systems incorporating data storage devices, for the automatic login and execution of test cases in the right environment.

The expert system is a computing system or a plurality of interconnected computing systems incorporating data storage devices with self-learning capability utilizing machine-learning techniques such as artificial intelligence.

The knowledge cache means, is a computing system or a plurality of interconnected computing systems incorporating data storage devices, containing the most recent data on individual products.

The multiproduct view cache means is a computing system or a plurality of interconnected computing systems incorporating data storage devices, containing the most recent views of various combinations of products.

The knowledge base means is a computing system or a plurality of interconnected computing systems incorporating data storage devices, containing all available data on supported products, not necessarily the most recent data.

The data in the knowledge bases, knowledge cache and the multiproduct view cache is updated whenever the expert system identifies the occurrence of new behaviour, or when a new product or a revision to an existing product are released into the system or when a solution is provided by the system expert to a problem that was forwarded by the automatic remote support system.

The said prescribed format includes but is not limited to Environment, Description, Action, Next, Testcase to facilitate effective interfacing.

The single computing system or a plurality of interconnected computing systems is a part of a network.

In a specific embodiment an automatic remote Support comprises:

- a means for prioritising electronically received support request,
- a means for parsing each said support request to extract information relating to actual behaviour, expected behaviour, as well as test case data, if any, and compiling final, actual and expected behaviour data in a prescribed format,
- the said formatted output is connected to a search engine to search the extracted behaviour data,
- one interface of the search engine is connected to a knowledge cache means for searching for a match with previously stored data relating to individual products,
- a second interface of the search engine is connected to a multiproduct view cache for searching for a match with previously stored data relating to views on combinations of products,
- a third interface of the search engine is connected to knowledge bases for searching for a match with previously stored data relating to supported products, the arrangement being such that the search engine will search first through the knowledge cache and if no complete or partial match is found will then search through the multiproduct view cache followed by the knowledge bases for providing the final output,
- the final interface of the search engine is connected to an expert system for providing the final solution or suggestions and follow-up questions in case a complete or partial match is found, and the request is forwarded to a system expert in case no match is found,
- one interface of the said expert system provides the solution in response to the input request, while the remaining outputs update the knowledge cache, multiproduct view cache and the knowledge bases using the self-learning abilities of the expert system to refine the organization of the data in order to improve the effectiveness of subsequent search operations, the updations being performed even if no input requests are received, in a controlled manner.

The other features of the specific embodiment are the same as described above.

This invention further provides in a computing system including a means for electronically receiving requests, a method for automatically processing support requests comprising the steps of:

- electronically receiving and prioritising the support requests describing expected and observed behaviour and optionally test case data,
- parsing the said electronically received request to extract actual and expected behaviour information and test case data, if any,
- compiling of final actual and expected behaviour data in a prescribed format,
- searching for previous occurrences of similar behaviour in a database,
- generating the final solution or suggestions, using the results of the search,
- updating of the database in case of new behaviour data as well as by using the self-learning abilities of the expert system to refine the organization of the data in order to improve the effectiveness of subsequent search operations, the updations being performed even if no input requests are received,
- forwarding of the request to a system expert in case a solution is not found.

The automatic execution of the test case data derived from the result of the said parsing, is used to confirm the reported actual behaviour.

In cases where multiple requests are received, each request is processed based on a prescribed priority handling mechanism.

In order to minimise delays, at each stage of the system a request is operated upon as soon as the previous request has been cleared without waiting for the completion of the processing of one request, providing the processing of the previous request is not compromised in any manner.

In a specific embodiment, in a computing system including a means for electronically receiving requests, a method for automatically processing support requests comprises the steps of:

- electronically receiving and prioritising the support requests describing expected and observed behaviour and optionally test case data,
- parsing the said electronically received request to extract actual and expected behaviour information and test case data, if any,
- compiling of final actual and expected behaviour data in prescribed format,
- searching for previous occurrence of similar behaviour in a knowledge cache, a multiproduct view cache followed by knowledge bases,
- generating the final solution or suggestions, using the results of the search,
- updating of the knowledge cache, multiproduct view cache and knowledge bases in case of new behaviour data as well as by using the self-learning abilities of the expert system to refine the organisation of the data in order to improve the effectiveness of subsequent search operations, the updations being performed even if no input requests are received,
- forwarding of the request to a system expert in case a solution is not found.

The other features of this specific embodiment of the method are the same as described above.

DETAILED DESCRIPTION OF THE INVENTION

The invention will now be described with reference to the accompanying drawings and examples:

Figure 1:
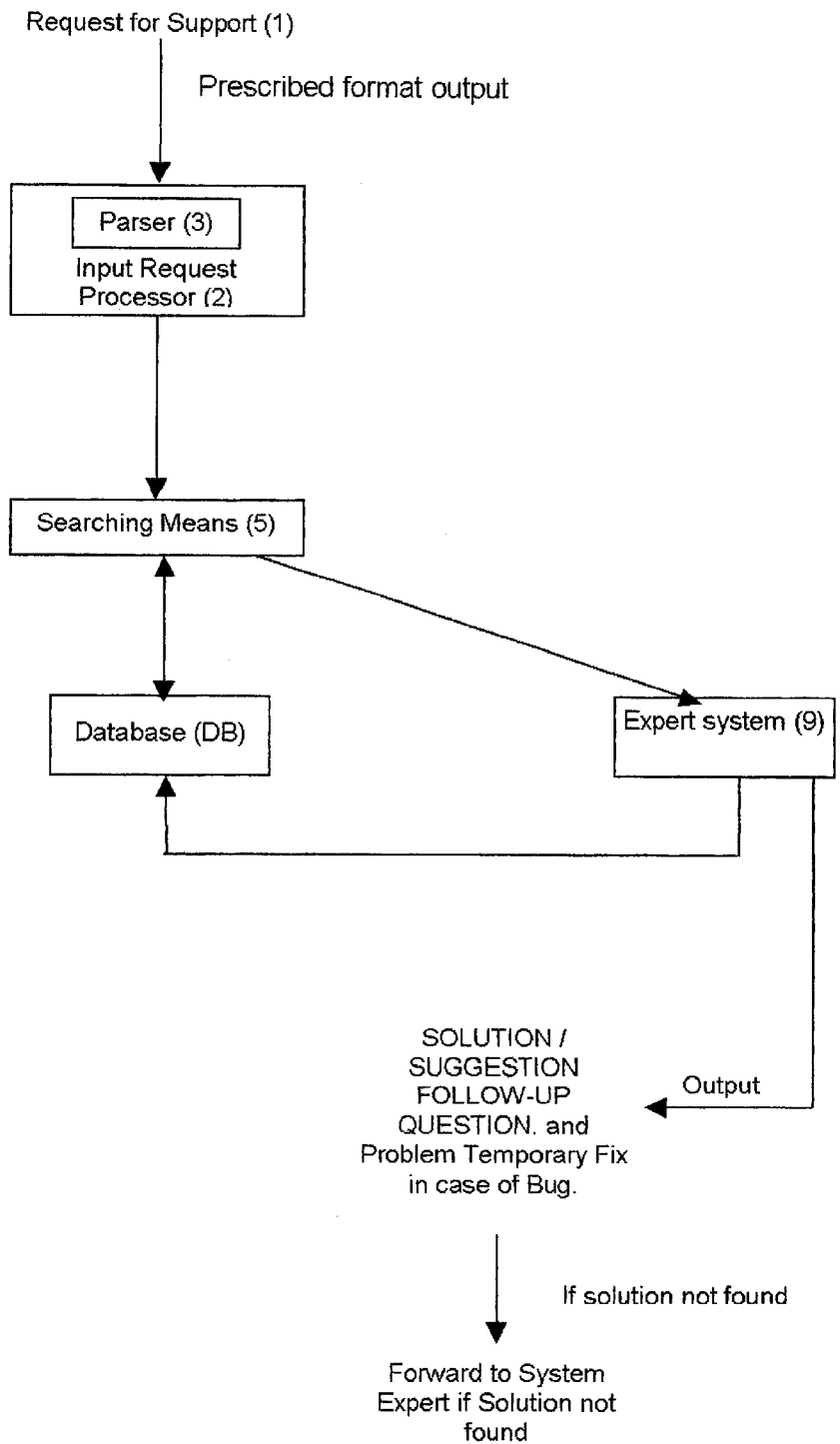
FIG 1 shows the automatic remote support according to this invention.

Referring to FIG. 1, Support Requests (1) are prioritised by an Input Request Processing System (2), which comprises of one or more interconnected computing systems and includes a Parser (3). The interface from the Input Request Processing System (2) containing the expected and actual behaviour is connected to the input of a Searching Means (5), which is implemented on a computing system. One interface from the Searching Means (5) is connected to the input of a Database (DB) containing information relating to the functionality, specifications and expected and actual of individual products as well as combinations of various products, along with identified solutions, which is implemented on one or more interconnected computing systems. The result of the entire search is presented as a final output by the Searching Means (5) to the interface of an Expert System (9) which generates the final solution or suggested solutions in case a complete or partial match is found, or forwards the request to a system expert if no match is found. The Expert System (9) is a self-learning system, which constantly refines and modifies the data in the Database (DB) in order to improve the effectiveness of the search operations even if no requests are received, in a controlled manner Referring to FIG. 2, Support Requests (1) are prioritised by an Input Request Processing System (2), which comprises of one or more interconnected computing systems and includes a Parser (3). The interface of the Parser (3) containing the test data extracted from the input request is connected to the input of a Test Execution System (4) comprising of one or more interconnected computing systems, for verifying the symptoms of the input request. The interface from the Test Execution System (4) containing the results of the testing is fed back to another input of the Input Request Processing System (2). The interface from the Input Request Processing System (2) containing the expected and actual behaviour is connected to the input of a Searching Means (5), which is implemented on a computing system. One interface from the Searching Means (5) is connected to the input of a Knowledge Cache (6), which may also be referred to as a Data Cache, Information Cache Solution Cache, or Problem Cache, containing the most recent report of information pertaining to the expected and actual behaviour of individual products along with identified solutions, which is implemented on one or more interconnected computing systems. A second interface from the Searching Means (5) is connected to an interface of a Multiproduct View Cache (7) also termed as Data Cache, Information Cache, Solution Cache, or Problem Cache containing views on the most recent report of information pertaining to the expected and actual behaviour of various combinations of products, which is implemented on one or more interconnected computing systems. A third interface from the Searching Means (5) is connected to a set of Knowledge Bases (8) containing all available information pertaining to the expected and actual behaviour of individual products as well as multiproduct combinations along with identified solutions, implemented on one or more interconnected computing systems. Interfaces exist from the Knowledge Cache (6), Multiproduct View Cache (7) and Knowledge Bases (8) to the Searching Means (5). The result of the entire search is presented as a final output by the Searching Means (5) to the interface of an Expert System (9) which generates the final solution or suggested solutions in case a complete or partial match is found, or forwards the request to a system expert if no match is found. The Expert System (9) is a self-learning system which constantly refines and modifies the data in the Knowledge Cache (6), Multiproduct View Cache (7) and Knowledge Bases (8) in order to improve the effectiveness of the search operations even if no requests are received, in a controlled manner Referring to FIG. 3, the input Support Requests are first prioritised and then parsed to extract information relating to actual and expected behaviour, priority as well as test data (if any). The test data (if any) is then used to perform automatic execution of the reported problem in order to confirm the reported behaviour as well as to obtain any additional information that may be possible to identify. The results of the automatic testing are then taken along with the data extracted from the input Support Request to generate a final report of actual and expected behaviour in an appropriate format. The data is used to search through the Knowledge Cache, which contains the most recent record of data relating to individual products, for data on the reported behaviour. If such a record is found completely or partially then the information is extracted and processed to furnish as a solution for this request, in an appropriate format. If the search fails then a search is carried out on the Multiproduct View Cache that executes related views and fetches data from the knowledge base in a like manner. If no match is obtained then the search is repeated on the Knowledge Base, which is a repository of all available data on supported products, not necessarily the most recent data. The data obtained in the case of a complete or partial match is processed to furnish a solution for this request, in an appropriate format. If however, no match is found then the problem is forwarded to a system expert for providing a manually derived solution.

The data in the knowledge bases, knowledge cache and the multiproduct view cache is updated whenever the expert system identifies the occurrence of new behaviour, or when a new product or a revision to an existing product are released into the system or when a solution is provided by the system expert to a problem that was forwarded by the automatic remote support system. In addition the self-learning abilities of the expert system are used to refine and modify the organisation of the data in order to improve the effectiveness of subsequent search operations, the updations being performed even if no input requests are received in a controlled manner, In cases where multiple requests are received, each request is processed based on priority.

In order to minimize delays, at each stage of the system a request is operated upon as soon as the previous request has been cleared without waiting for the completion of the processing of one request based on priority, Working Support Requests (1) are received from a network or e-mail system (not shown) in a prescribed format that includes but is not limited to Environment, Description, Action, Next, Testcase by an Input Request Processing System (2), which comprises one or more interconnected computing systems and includes a Parser (3). The Input Request Processing System (2) prioritises the requests and then the Parser (3) analyses the Support Request (1) and extracts information relating to observed and expected behaviour, priority as well as test data, if provided. The test data, if provided in the Support Request (1), is extracted by the Parser (3) and forwarded by the Input Request Processing System (2) to a Test Execution System (4) which performs the tests with the data furnished to verify the behaviour and provide any other additional inputs that may not have been communicated in the Support Request. This information is fed back to the Input Request Processing System (2) which then prepares an output definition of the expected and observed behaviour in a defined format and forwards to a. Searching Means (5) which initiates a search in a database (DB). If a complete or partial match is found with a previously recorded request then the results of that analysis are retrieved and furnished to the Expert System (9), which then processes it and presents the solution in an appropriate format. If however, no such match is found then the Expert System (9) forwards the request to a system expert for manual analysis. The Expert System (9) uses its self-learning abilities to constantly refine the data organisation in the database (DB) in order to improve the effectiveness of subsequent search operations in a controlled manner.

Figure 2:
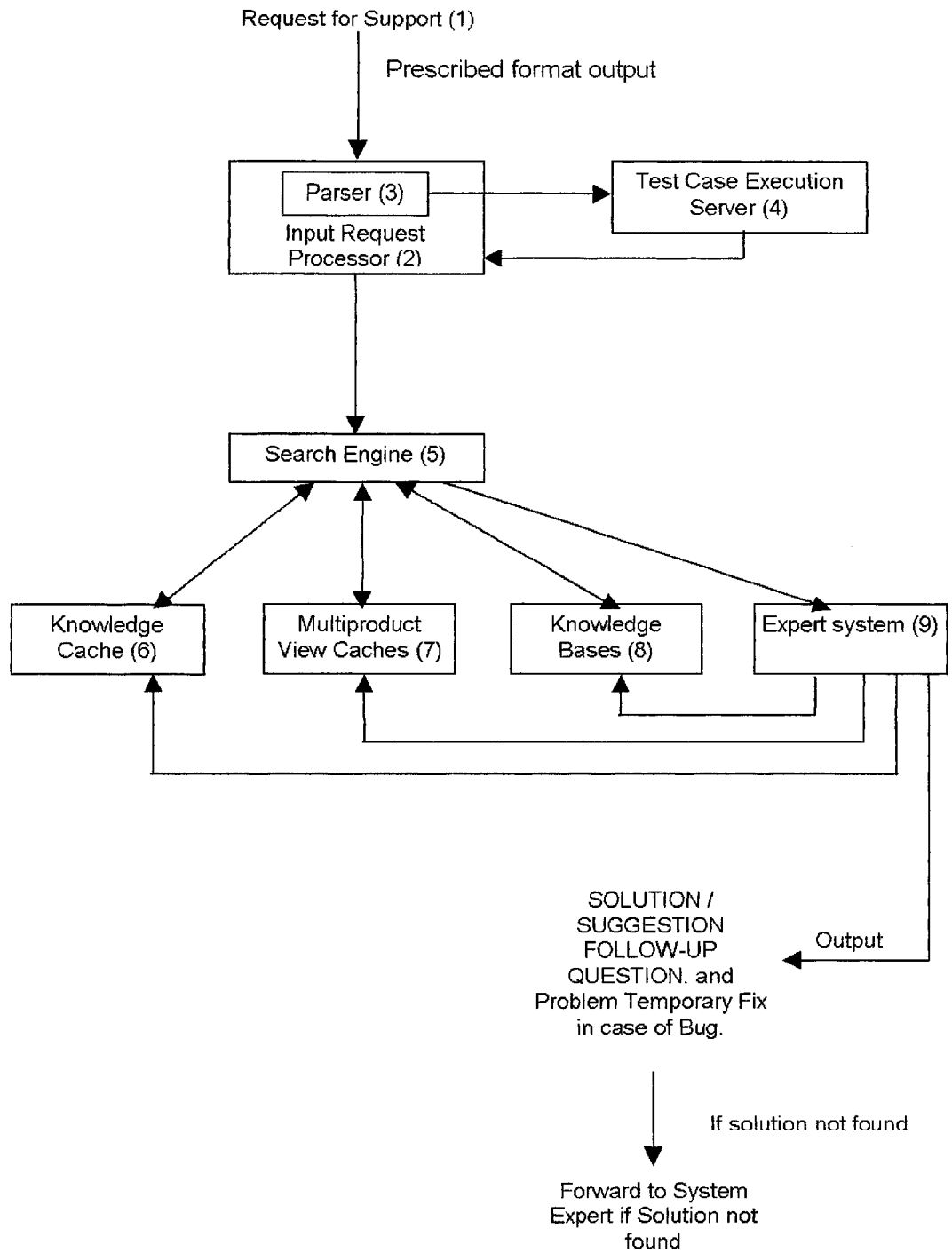
FIG. 2 shows the specific embodiment of the invention of the automatic support system.
Figure 3:
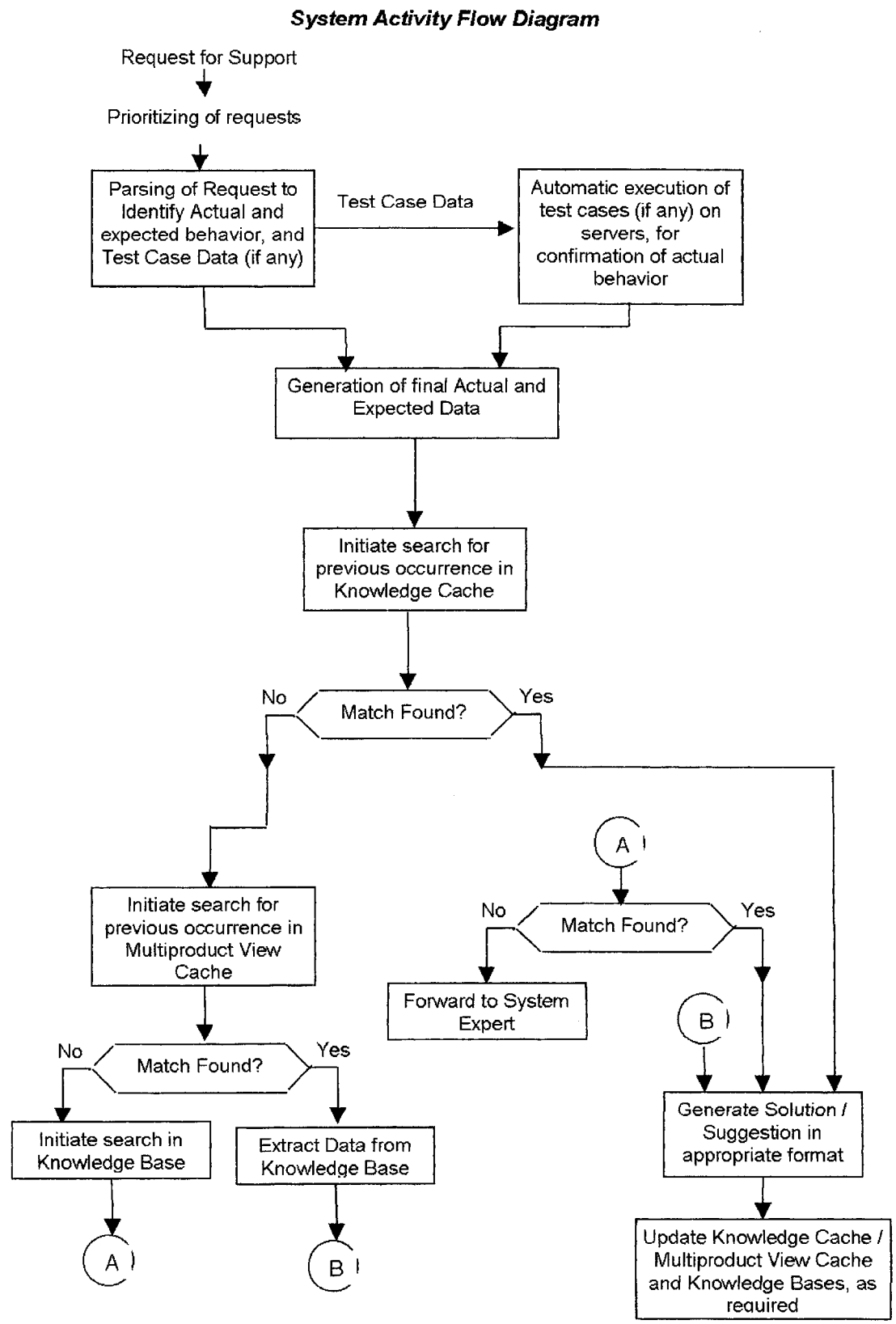
FIG. 3 shows the sequence of activities performed in the processing of the input request.

In a specified embodiment, as shown in FIG. 2, Support Requests (1) are received from a network or e-mail system (not shown) in EDANT format by an Input Request Processing System (2), which comprises one or more interconnected computing systems and includes a Parser (3). The Input Request Processing System (2) prioritises the requests and then the Parser (3) analyses the Support Request (1) and extracts information relating to observed and expected behaviour, priority as well as test data, if provided. The test data, if provided in the Support Request (1), is extracted by the Parser (3) and forwarded by the Input Request Processing System (2) to a Test Execution System (4) which performs the tests with the data furnished to verify the behaviour and provide any other additional inputs that may not have been communicated in the Support Request. This information is fed back to the Input Request Processing System (2) which then prepares an output definition of the expected and observed behaviour in a defined format and forwards to an Searching Means (5) which initiates a search in the Knowledge Cache (6) containing the most recent data on individual products for a possible match. If no match is found then the Searching Means (5) initiates a search in the Multiproduct View Cache (7) containing the most recent data on views of various multiproduct product combinations, for a possible complete or partial match with a previously recorded data. If a match is found then the view obtained is used to extract the associated data from Knowledge Bases (8) which contain all available recorded data on supported products but not necessarily the most recent data. If however, no match is found then the Searching Means (5) initiates the search on the larger database in the Knowledge Bases (8). If a complete or partial match is found with a previously recorded request then the results of that analysis are retrieved and furnished to the Expert System (9), which then processes it and presents the solution in an appropriate format. If however, no such match is found then the Expert System (9) forwards the request to a system expert for manual analysis. The Expert System (9) uses its self-learning abilities to constantly refine the data organisation in the Knowledge Cache (6), Multiproduct View Cache (7) and Knowledge Bases (8) in order to improve the effectiveness of subsequent search operations in a controlled manner The invention Will Be Further Illustrated By Means of the Following Examples:

1. Case-1:

Consider the case when a problem report is received for a particular product on a particular environment.

Let's say that:

Product p1

Environment: e1

Solution: s1 (that has been found already)

Now, if this solution s1 happens to involve either p1 or e1 or a combination of p1 and e1, this knowledge could be used whenever there is a problem reported with (p1, e2) or (p2, e1). Now s1 could be suggested as the new solution or a follow up question depending on the content of s1.

This can be used to refer to the multiproduct cache for the most probable hit.

The machine learning engine updates the multiproduct cache and the knowledge bases with the knowledge representations like (p1, e2, s1), (p2,e1,s3) etc.

Thus as the number of problems/solutions set increases. The multiproduct cache and the knowledge bases are updated with new information by the machine learning engine in a controlled manner, which comes with new associations of product, environment and solution combinations. The machine learning engine in the expert system ensures consistency and relevance of new data or knowledge generated with respect to product features, problems and solutions. It also ensures that such generation of new data or knowledge does not continue unchecked leading to an explosive condition where the system resources are exceeded and the system fails.

2. Case-2:

If the contents are in the EDANT form 2.1 We could have various components that constitute the environment.

E—e1, e2, e3, . . . , en 2.2 We could have various components that constitute the descriptions D—d1, d2,, d3, . . . , dn 2.3 Many action components could constitute the action taken A—a1, a2, . . . ,, an A solution s1 may exist for a set (E,D,A)

The solution s1 may include a change in any of the subcomponents of E,D or A. When a new problem information is received, each of the sub-components can be compared with the one associated with the existing solutions.

a. these can be suggested as probable solutions b. These could be the basis of a follow up question.

The above examples are only illustrative of some features in the proposed implementation of the machine learning engine in the expert system. The machine learning engine is not limited by these features

What is claimed is:

1. A computer implemented support system comprising:
 a prioritising means for prioritising electronically received support requests, wherein such a support request includes a problem report describing actual and expected behaviour information, the behaviour information including a particular product, p1, and environment, e1, for the problem,
 a parsing means for parsing each said support request to extract the actual and expected behaviour information, including the particular product and environment for the problem, and compiling such actual and expected behaviour information in a prescribed data format for identifying the particular product and environment for the problem,
 a searching means for connecting to the formatted data for the expected and actual behaviour information and searching in a database for previous occurrences of similar behaviour, and
 updating means for updating the database, wherein the updating means updates the database in response to identification of new behaviour and also performs self-learning, wherein the updating means also updates the database in response to the self-learning to refine organization of the database in order to improve effectiveness of subsequent searches, wherein the previous occurrences of the similar behaviour are represented in the database in the prescribed data format, and the refining of the database organization includes forming associations, in the prescribed data format, of the product, p1, and another environment, e2, and of the environment e1, and another product, p2, wherein the updating means performs its self-learning independently of the updating in response to identification of new behaviour so that the updations in response to the self-learning are performed even if no support requests are received.

2. A system as claimed in claim 1 wherein the support request is received through a mailing system or via a network.

3. A system as claimed in claim 1 wherein the means for parsing the support request includes a standard or custom-designed parsing system.

4. A system as claimed in claim 1 wherein the searching means includes a search engine.

5. A system as claimed in claim 1 wherein the database contains information relating to functionality, specifications and behaviour, including reported problems and their solutions, for individual products as well as combinations of products.

6. A system as claimed in claim 1 wherein the database includes a combination of multiple entities in order to improve effectiveness of the searching.

7. A system as claimed in claim 1 wherein the database includes a knowledge cache containing most recent information relating to individual products, a multi-product view cache containing most recent views on various product combinations, and a set of knowledge bases containing all available information on individual products as well as product combinations.

8. A system as claimed in claim 7 comprising:
means for forwarding the request to a system expert if a solution is not found.

9. A system as claimed in claim 8 wherein the data in the knowledge base, knowledge cache and the multiproduct view cache is updated responsive to a release of a new product, a revision to an existing product, and a solution provided by the system expert.

10. A system as claimed in claim 1 wherein the system includes:
means for generating a final solution or suggestion using a result of a search performed by the searching means.

11. A system as claimed in claim 10 wherein the means for generating a final solution or suggestion includes an expert system with self-learning capability.

12. A system as claimed in claim 1 wherein the means for updating the database includes an expert system with self-learning abilities.

13. A system as claimed in claim 1, wherein such a support request includes test data, the parsing means parses the support request to extract the test data and compiles the test data in the prescribed data format, and wherein the system includes:
test execution means for receiving the extracted test data and executing the extracted test data in order to confirm the reported behaviour.

14. A system as claimed in claim 13 wherein the test execution means includes a computing system for automatic login and execution of test cases.

15. A system as claimed in claim 1 wherein the prescribed data format includes but is not limited to Environment, Description, Action, Next, Testcase to facilitate effective interfacing.

16. A system as claimed in claim 1 wherein the system is a part of a network.

17. In a computing system including a means for electronically receiving requests, a method for automatically processing support requests comprising the steps of:
a) electronically receiving and prioritising the support requests, wherein such a support request includes a problem reported describing expected and actual behaviour information, the behaviour information including a particular product, p1, and environment, e1, for the problem,
b) parsing the electronically received request to extract the actual and expected behaviour information, including the particular product and environment for the problem,
c) compiling the actual and expected behaviour information in a prescribed data format, for identifying the particular product and environment for the problem,
d) searching in a database for previous occurrences of similar behaviour,
e) updating the database in response to step d) indicating a case of new behaviour, and
f) updating the database in response to analysis of the database by an expert system to refine organization of the database in order to improve effectiveness of subsequent searches, wherein the previous occurrences of the similar behaviour are represented in the database in the prescribed data format, and the refining of the database organization includes forming associations, in the prescribed data format, of the product, p1, and another environment, e2, and of the environment, e1, and another product, p2, wherein the updating in step f) is independent of the updating of step e) so that the updations of step f) are performed even if no support requests are received.

18. In a computing system including a means for electronically receiving requests, a method as claimed in claim 17, wherein such a support request includes test data, step b) includes parsing the support request to extract the test data, step c) includes compiling the test data in the prescribed data format, and the method includes the step of:
executing the test data to confirm the reported actual behaviour.

19. In a computing system including a means for electronically receiving requests, a method as claimed in claim 17 wherein in cases where multiple requests are received, each request is processed based on a prescribed priority handling mechanism.

20. In a computing system including a means for electronically receiving requests, a method as claimed in claim 17, including the step of:
generating a final solution or suggestion using a result of the searching.

21. In a computing system including a means for electronically receiving requests, a method for automatically processing support requests as claimed in claim 17, wherein the database includes a knowledge cache, a multiproduct view cache and a knowledge base, and step d) includes the steps of:
searching in the knowledge cache for previous occurrence of similar behaviour
searching in the multiproduct view cache for previous occurrence of similar behaviour, and
searching in the knowledge base for previous occurrence of similar behaviour.

22. In a computer system including a means for electronically receiving requests, a method as claimed in claim 21, including the step of:
forwarding the request to a system expert if a solution is not found.

23. In a computer system including a means for electronically receiving requests, a method as claimed in claim 22 including the step of:
updating the knowledge base, knowledge cache and the multiproduct view cache responsive to a release of a new product, a revision to an existing product, and a solution provided by the system expert.

24. In a computer system including a means for electronically receiving requests, a method as claimed in claim 17 wherein in cases where multiple requests are received, each request is processed based on a prescribed priority handling mechanism.

* * * * *